United States Patent Office 3,639,381
Patented Feb. 1, 1972

3,639,381
POLYETHYLENE PROCESS AND CATALYST
William J. Craven, Passaic, N.J., assignor to Allied
Chemical Corporation, New York, N.Y.
No Drawing. Filed May 10, 1968, Ser. No. 728,336
Int. Cl. C08f 1/66, 3/06
U.S. Cl. 260—94.9 D
1 Claim

ABSTRACT OF THE DISCLOSURE

This invention relates to an improved method of preparing polyethylene as a slurry in an inert hydrocarbon diluent. In accordance with the present invention, linear polyethylene having a relatively high melt index is obtained by employing a novel catalyst system which is a mixture of chromium oxide on a silica base and an organoaluminum compound prepared by partially oxidizing a trialkyl aluminum compound with an oxygen-containing gas. Polymerization is carried out in the presence of hydrogen. The polyethylene of this invention is readily processed and can be used in the preparation of films, molded articles and other known uses for polyethylene.

It is known in the art that ethylene can be polymerized by the use of a catalyst containing chromium on a silica or silica/alumina catalyst support. For example, in U.S. Pat. 2,825,721, there is disclosed a process for the polymerization of ethylene which employs a solvent for the polymer and a catalyst prepared by depositing an aqueous solution of $CrO_3$ on silica/alumina followed by drying and activation in hot air for several hours. The final polymer of this process is obtained in solution form. In U.S. Pat. 2,949,447, a similar process is disclosed in which the liquid medium and polymerization conditions are such that the polymer produced is not dissolved and the polymer is obtained as discrete particles suspended in a slurry. When a slurry procedure such as disclosed in U.S. Pat. 2,949,447 is used the polyethylene produced is characterized by a very low melt index and a high molecular weight which makes processing such polyethylene very difficult. To overcome this problem, polyethylene prepared by the slurry method is generally blended with high melt index polyethylene prepared by a solution procedure in order to give a more processable product.

In accordance with the present invention, it has been discovered that by using a novel catalyst system and carrying out the polymerization in the presence of hydrogen, a high melt index readily processable polyethylene can be produced by slurry polymerization. This catalyst system contains chromium oxide on silica base and an organoaluminum compound produced by partially oxidizing a trialkyl aluminum compound by contact with an oxygen-containing gas.

The polymerization procedure of this invention is carried out at a temperature of about 180°–230° F.; preferably 190°–220° F. in the presence of a hydrocarbon which is liquid under the reaction conditions and which acts as a diluent and not a solvent for polyethylene under the reaction conditions employed. Preferred hydrocarbon diluents are paraffins including cycloparaffins and particularly paraffins and cycloparaffins having 3–12 carbon atoms; additionally, aromatic hydrocarbons, of 6–12 carbon atoms can be employed. Illustrative of diluents are propane, isobutane, n-pentane, isopentane, neopentane, 2,2,4 - trimethylpentane, cyclohexane, methylcyclohexane, benzene and naphthalene. Ethylene is contacted with the catalyst and hydrogen while maintaining the ethylene within the system at a pressure of between about 10–1,000 p.s.i., preferably 200–600 p.s.i.

The supported chromium oxide used as a component of the catalyst system can be prepared by the procedures described in U.S. Pat. 2,825,721. It generally contains 0.1–20% by weight preferably about 1–5% by weight of chromium as $CrO_3$ supported on a silica base, the term "silica base" signifying a silica or silica-alumina composite which preferably has a relatively high surface area. As described in U.S. Pat. 2,825,721, chromium oxide or a compound convertible to chromium oxide on calcination is incorporated onto the support by such means as impregnation followed by activation. Preferably, the activation is carried out by heating in air at a temperature of about 750–1800° F. for at least three hours, preferably, at least six hours.

The organoaluminum compound employed in the catalyst system is prepared by partially oxidizing a trialkyl aluminum compound of the formula

where $R_1$, $R_2$ and $R_3$ are independently alkyl groups of 1–8 carbon atoms. The oxidation is carried out by dissolving the trialkyl aluminum in an inert solvent such as cyclohexane and treating the dissolved trialkyl aluminum with an oxygen-containing gas such as air. This treatment can be carried out at a temperature of about 0–100° C. The extent of the oxidation is preferably between about 0.01–1.0 mol of oxygen per mol of trialkyl aluminum. While applicants do not wish to be bound by any particular theory, it is believed that the oxidation forms alkoxide groups on the trialkyl aluminum compound. While there is no upper limit as to the amount of organoaluminum used, preferably about 0.5–5 parts by weight of the organoaluminum compound are used per part of the chromium oxide catalyst composition. The organoaluminum compound can be added to the polymerization system dissolved in the same solvent used in the oxidation procedure. During the polymerization, hydrogen is fed into the system. Preferably, hydrogen is maintained at a pressure of about 10–200 p.s.i.

The process of this invention can be carried out as a batch process by pressuring the ethylene into a reactor containing the catalyst system, hydrogen and the hydrocarbon diluent. Furthermore, the process can be carried out continuously by maintaining the above-described concentration of reactants in the reactor for a suitable residence time. The residence time used in a continuous process can vary widely since it depends to a great extent upon the temperature at which the process is conducted. However, the residence time generally falls within the range of 1 second to an hour or more. In the batch process, the time for the reaction can also vary widely such as up to 24 hours or more.

The following examples are given to further illustrate the invention, but it is to be understood that the invention is not to be limited in any way by the terms described therein. In the examples the melt index was measured at 190° F. using a 2,160 gram weight in accordance with ASTM D–1238 Condition E and the High Load Melt Index was measured at 190° F. using a 21,600 gram weight in accordance with ASTM D–1238, Condition F.

The chromium oxide catalyst was prepared by impregnating silica gel with 2% by weight of $CrO_3$ and then activating the catalyst by treatment with a stream of air at 1480° F. for six hours.

EXAMPLE I

Run A

Into a stainless-steel reactor were added 0.58 gram of chromium oxide on silica catalyst and 700 milliliters of freshly distilled n-pentane. The reactor was closed and heated to 210° F. at which temperature ethylene was added until a gauge pressure of 450 p.s.i. was reached. The reaction was continued for 40 minutes at 210–216° F. adding sufficient ethylene to maintain the gauge pressure of 450 p.s.i.g. The solid product was then recovered, washed with fresh solvent and dried in a vacuum oven. A total of 120 grams of dried polyethylene were obtained having a melt index of 0.1 and a high load melt index of 12.0. The catalyst reactivity was 330 grams polyethylene/gram catalyst/hour.

Run B

Into a stainless-steel reactor were added 0.57 gram of chromium oxide on silica catalyst and 700 milliliters of freshly distilled n-pentane. The reactor was closed and hydrogen introduced until a gauge pressure of 40 p.s.i. was obtained. The temperature of the reactor was raised to 210° F. and ethylene added to bring the total reactor pressure to 450 p.s.i.g. The reaction was continued for 40 minutes at 210–215° F. adding sufficient ethylene to maintain the pressure at 450 p.s.i.g. A total of 152 grams of dry polyethylene was obtained having a melt index of 0.2 and a high load melt index of 18.5. Catalyst reactivity was 400 grams polyethylene/gram catalyst/hour.

Run C

Into a stainless steel reactor were added 0.20 gram of chromium oxide on silica catalyst and 700 milliliters of freshly distilled n-pentane. The reactor was closed and hydrogen introduced to a gauge pressure of 60 p.s.i.g. There was then added 0.13 cc. of 0.5 molar solution of triisobutyl aluminum in cyclohexane solvent giving a triisobutyl aluminum to chromium molar ratio of 2:1. The reactor was heated to 210° F. and sufficient ethylene added to give a total reactor pressure of 450 p.s.i.g. The reaction was continued for 50 minutes adding sufficient ethylene to maintain the pressure at 450 p.s.i.g. A total of 143 grams of dry polyethylene was obtained having a melt index of 0.3 and a high load melt index of 23.0. The catalyst reactivity was 855 grams polyethylene/gram catalyst/hour.

Run D

In a closed bottle under an inert atmosphere, there was prepared 10 cc. of a 0.5 molar solution of triisobutyl aluminum in cyclohexane. The triisobutyl aluminum was then oxidized by adding 10 cc. of dry air to the bottle at room temperature.

Into a stainless-steel reactor were added 0.18 gram of chromium oxide on silica catalyst and 700 milliliters of freshly distilled pentane. The reactor was closed and hydrogen introduced to a gauge pressure of 50 p.s.i. There was then aded 0.11 cc. of the oxidized triisobutyl aluminum solution prepared above (an oxidized triisobutyl aluminum to chromium molar ratio of 2:1). The reactor was heated to 210° F. and ethylene added to give a total pressure of 450 p.s.i.g. The reaction was continued for 40 minutes adding sufficient ethylene to the reactor to maintain the 450 p.s.i.g. pressure. A total of 141 grams of dry polyethylene was obtained having a melt index of 1.7 and a high load melt index of 105. The catalyst reactivity was 1,170 grams polyethylene/gram catalyst/hour.

The results of Runs A through D are summarized in the following table:

| Run: | P.s.i.g. $H_2$ | Moles triisobutyl aluminum per mol chromium in catalyst | Melt index | High load melt index |
|---|---|---|---|---|
| A | 0 | 0 | 0.1 | 12.0 |
| B | 40 | 0 | 0.2 | 18.5 |
| C | 60 | 2 (unoxidized) | 0.3 | 23.0 |
| D | 50 | 2 (oxidized) | 1.7 | 105 |

EXAMPLE II

Into a stainless-steel reactor were added 0.10 gram of chromium oxide on silica catalyst and 700 milliliters freshly distilled pentane. The reactor was closed and hydrogen introduced to a gauge pressure of 50 p.s.i. There was then added 0.13 cc. of the oxidized triisobutyl aluminum solution described in Example 1, Run D (an oxidized triisobutyl aluminum to chromium molar ratio of 4:1). The reactor was heated to 210° F. and ethylene added to give a total pressure of 450 p.s.i.g. The reaction was continued for 50 minutes adding sufficient ethylene to maintain the pressure. A total of 96 grams of dry polyethylene was obtained having a melt index of 3.3. The catalyst reactivity was 1090 grams polyethylene/gram catalyst/hour.

EXAMPLE III

Into a stainless-steel reactor were added 0.09 gram of chromium oxide on silica catalyst and 700 milliliters of freshly distilled n-pentane. The reactor was closed and hydrogen introduced to a gauge pressure of 50 p.s.i.g. There was then added 0.17 cc. of the oxidized triisobutyl aluminum solution described in Example 1, Run D (a triisobutyl aluminum to chromium mole ratio of 6:0). The reactor was heated to 210° F. and ethylene added to give a total pressure of 450 p.s.i.g. The reaction was continued for 1 hour adding sufficient ethylene to maintain pressure. A total of 39 grams dry polyethylene was obtained having a melt index of 1.5 and a high load melt index of 96. Catalyst reactivity was 425 grams polyethylene/gram catalyst/hour.

We claim:

1. A process of preparing polyethylene having a density in the range of 0.94 to 0.97 as a slurry in an inert hydrocarbon diluent, said method comprising contacting ethylene in said inert hydrocarbon diluent in the presence of hydrogen at a temperature of from about 180° F. to 230° F. with a catalyst comprising a mixture of chromium oxide on a silica base, said chromium oxide having been activated at a temperature of about 750° F. to 1500° F., and at least 50 percent by weight, based on the weight of the chromium oxide, of an organoaluminum compound prepared by partially oxidizing a trialkyl aluminum compound of the formula $AlR_3$ wherein R is an alkyl group of 1 to 8 carbon atoms with between about 0.01 and 1.0 mol of oxygen per mol of trialkyl aluminum.

References Cited

UNITED STATES PATENTS

| 2,898,328 | 8/1959 | Reed et. al. | 260—93.7 |
| 3,081,286 | 3/1963 | McKinnis | 260—93.7 |
| 3,051,690 | 8/1962 | Vandenberg | 260—88.2 |

FOREIGN PATENTS

| 570,981 | 3/1959 | Belgium. |

JOSEPH L. SCHOFER, Primary Examiner

E. J. SMITH, Assistant Examiner

U.S. Cl. X.R.

252—428, 430